United States Patent [19]

Saito et al.

[11] Patent Number: 4,702,079
[45] Date of Patent: Oct. 27, 1987

[54] AIR-COOLED TYPE INTERCOOLER FOR A SUPERCHARGED INTERNAL COMBUSTION ENGINE

[75] Inventors: Taiji Saito, Okazaki; Akira Kotani, Toyota, both of Japan

[73] Assignee: Toyota Kidosha Kabushiki Kaisha, Japan

[21] Appl. No.: 782,447

[22] Filed: Oct. 1, 1985

[30] Foreign Application Priority Data

Oct. 11, 1984 [JP] Japan .................. 59-211518

[51] Int. Cl.⁴ .......................................... F02B 29/04
[52] U.S. Cl. ...................................... 60/599; 165/41; 180/68.4
[58] Field of Search .................. 60/599; 123/563; 165/149, 41, 148; 180/68.4

[56] References Cited

U.S. PATENT DOCUMENTS

| | | | |
|---|---|---|---|
| 3,203,499 | 8/1965 | Bentz et al. | 165/41 X |
| 3,763,953 | 10/1973 | Yoda et al. | 180/68.4 |
| 4,062,188 | 12/1977 | Cutler et al. | 60/599 |
| 4,125,280 | 11/1978 | Kuzel | 165/148 X |
| 4,510,991 | 4/1985 | Kawahira | 165/41 |

FOREIGN PATENT DOCUMENTS

| | | | |
|---|---|---|---|
| 58-6926 | 1/1983 | Japan . | |
| 1065206 | 4/1967 | United Kingdom | 60/599 |

Primary Examiner—Michael Koczo
Assistant Examiner—Richard R. Cole
Attorney, Agent, or Firm—Parkhurst & Oliff

[57] ABSTRACT

An intercooler for a supercharger in an internal combustion engine for a vehicle. The intercooler is an air cooled type provided with a pair of tanks which are connected by a core having a plurality of parallel heat exchanger pipes, between which cooling air is passed to cool the air in the pipes. Each heat exchanging pipe is vertically extended. The core has a horizontal elongation in the direction in which the pipes are arranged in juxtaposition which is larger than the vertical elongation in the direction in which each heat exchanger pipe is extended.

2 Claims, 7 Drawing Figures

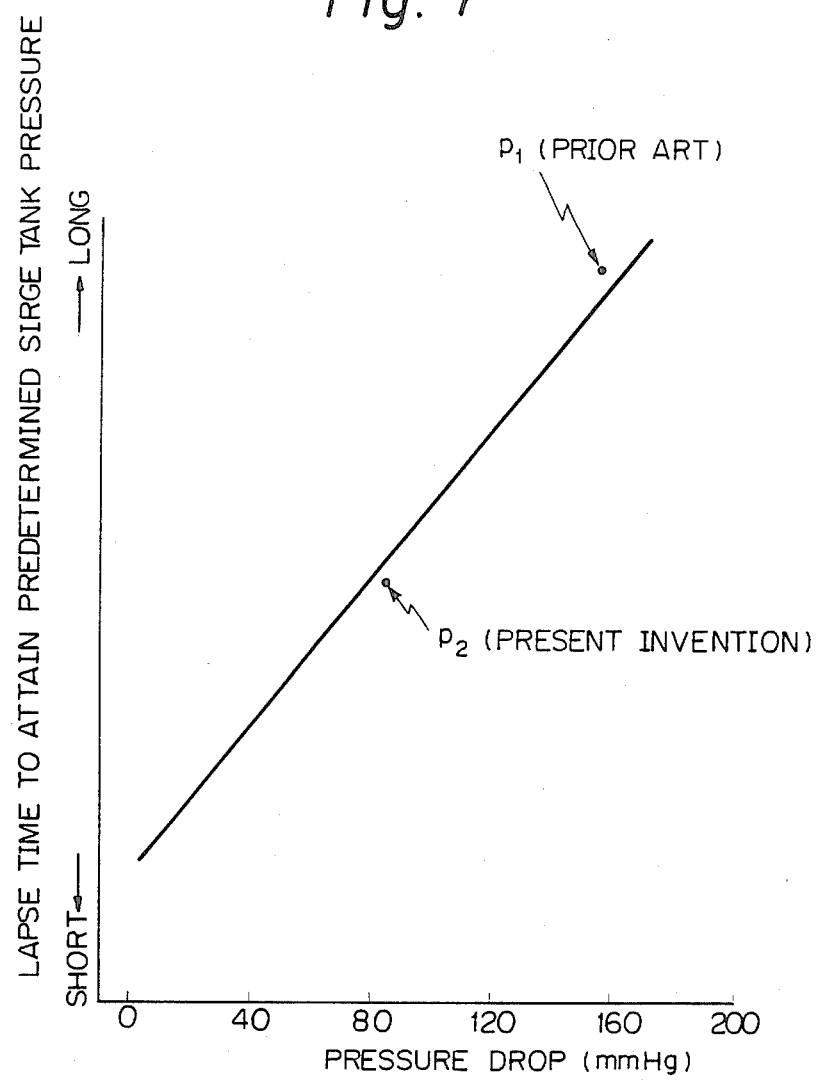

AIR-COOLED TYPE INTERCOOLER FOR A SUPERCHARGED INTERNAL COMBUSTION ENGINE

BACKGROUND OF THE INVENTION

1. Field of the Invention

The present invention relates to an air-cooled type intercooler for a supercharged internal combustion engine for a vehicle.

2. Description of the Related Art

In a supercharged internal combustion engine, an intercooler is advantageously arranged downstream of the supercharger, such as a turbocharger, to decrease the temperature of air introduced into the engine from the turbocharger. The decreased air temperature decreases the occurrence of knocking, even when a high compression ratio is employed. Furthermore, the air density is increased and thus the volumetric efficiency is increased. Due to the high compression ratio and high volumetric efficiency, an increased engine power is obtained, which is the intrinsic object of employing a supercharged system.

In the prior art, an air cooled type intercooler was proposed, wherein a pair of air tanks are connected to the supercharger and the engine, respectively, and a core having a plurality of juxtaposed heat-exchanging pipes connect the tanks to each other. In the prior art construction, the heat exchanger pipes are juxtaposed in the vertical direction and each heat exchanger pipe extends in a horizontal direction. The elongation of the core in the horizontal direction to accommodate the extension of the heat exchanger pipes is larger than the elongation of the core in the vertical direction to accommodate the juxtaposed pipes. That the horizontal elongation should be larger than the vertical elongation is inevitable, since the space for arranging the intercooler, which is located in the front portion of the engine room at a position between the radiator and radiator grille or air dam skirt, also is elongated in the horizontal direction rather than in the vertical direction. However, this construction causes the length of the heat exchanger pipes, which have a limited diameter, to be increased, and thus a large pressure drop is generated when air is passed through the heat exchanger pipes. The large pressure drop requires an increase of the pressure at the output of the turbocharger, to obtain the necessary engine output power. This means that the turbocharger must be rotated at a high rotational speed, which has an adverse effect on the reliability of the turbocharger over a long period of operation.

SUMMARY OF THE INVENTION

An object of the present invention is to provide an intercooler capable of decreasing the pressure drop generated when the air is passed through the intercooler.

According to the present invention, an intercooler for a supercharged internal combustion engine for a vehicle is provided, comprising:

an inlet tank adapted to be connected to the supercharger for receiving air therefrom;

an outlet tank adapted to be connected to the engine for introducing the air into the engine; and, a radiator core arranged between the inlet tank and the outlet tank, this radiator core comprising a plurality of horizontally juxtaposed and vertically extending heat exchanger pipes and between which pipes air can be passed so as to cool the air in the pipes; the length of the core in the horizontal direction where the heat exchanger pipes are juxtaposed being larger than the length of the core in the vertical direction to which each heat exchanger pipe extends.

DESCRIPTION OF A PREFERRED EMBODIMENT

Figure 1:
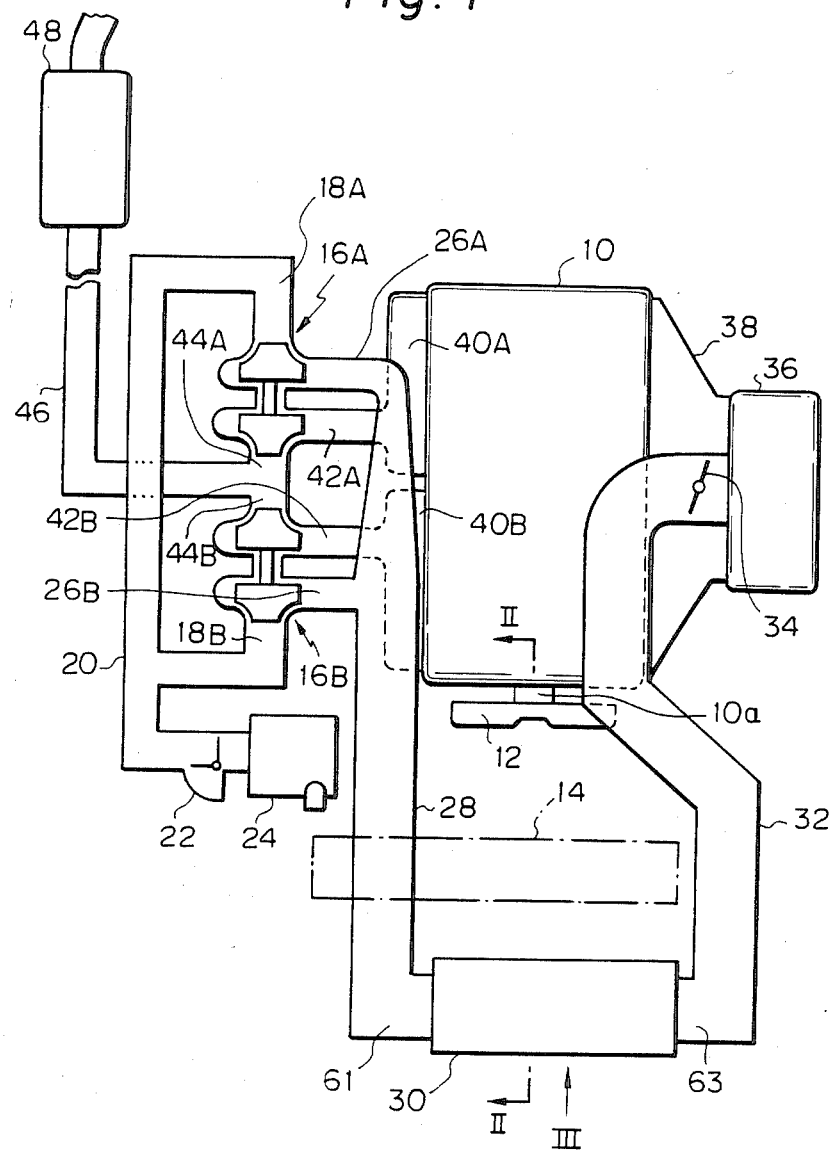
FIG. 1 shows an arrangement of the turbocharged engine according to the present invention as located in an engine room of a vehicle, and as seen from above.

Referring to FIG. 1, which is a general view from above of an internal combustion engine of the present invention, reference numeral 10 denotes an engine body arranged in an engine room (not shown in FIG. 1) of a vehicle. A cooling fan 12 is arranged in front of the engine body 10 in such a manner that it is operated by a crankshaft 10a. A radiator 14 is arranged in front of the fan 12. The engine is a 6-cylinder, so-called twin-turbo type provided with two turbochargers 16A and 16B. The turbochargers 16A and 16B are provided with compressor inlets 18A and 18B, respectively, connected to an intake pipe 20. The intake pipe 20 is connected, via an airflow meter 22, to an air cleaner 24. The turbochargers 16A and 16B are provided with compressor outlets 26A and 26B, respectively, connected to an intake pipe 28. The intake pipe 28 is connected to an intercooler 30, which is constructed in accordance with the present invention as will be fully described later. The intercooler 30 is connected, via an intake pipe 32, a throttle valve 34, a surge tank 36, and an intake manifold 38, to the engine cylinders (not shown). The not-shown engine cylinders are divided into two groups, i.e., a first group including the first, second and third cylinders, and a second group including the fourth, fifth and sixth cylinders. These groups are connected to first and second exhaust manifolds 40A and 40B, respectively, which are connected to turbine inlets 42A and 42B of the turbochargers 16A and 16B, respectively. The turbochargers 16A and 16B are provided with turbine outlets 44A and 44B, respectively, which are connected, via an exhaust pipe, to a muffler 48.

Figure 2:
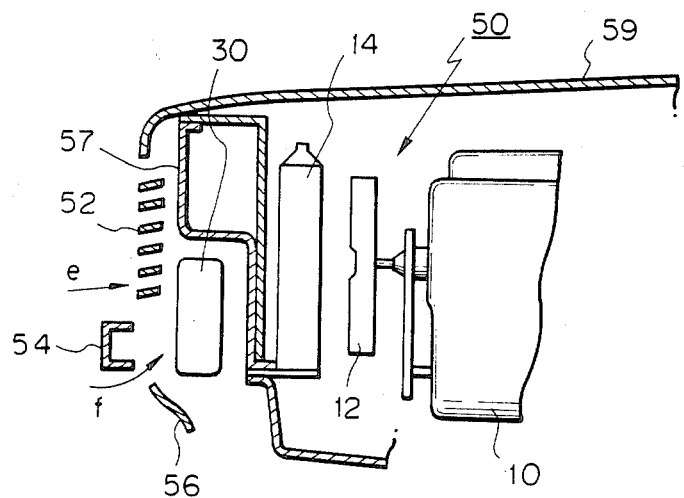
FIG. 2 is a schematic cross sectional view taken along the line II—II of FIG. 1.

In FIG. 2, which shows the inside of the engine room along a longitudinal direction, the intercooler 30 is arranged between the radiator 14 and a radiator grille 52. Located below the radiator grille 52 is a bumper 54, and an air dam skirt 56 is arranged below the bumper 54. Reference numberal 57 denotes a hood lock support on which a hood lock (not shown) is arranged for locking the engine hood 59. When the vehicle is moving, air is introduced inside the engine room 50 via the radiator grille 52 and a space between the bumper 54 and the air dam skirt 56, as shown in FIG. 2 by arrows e and f, so that the air flow impinges on and cools the inter cooler 30.

Figure 3:
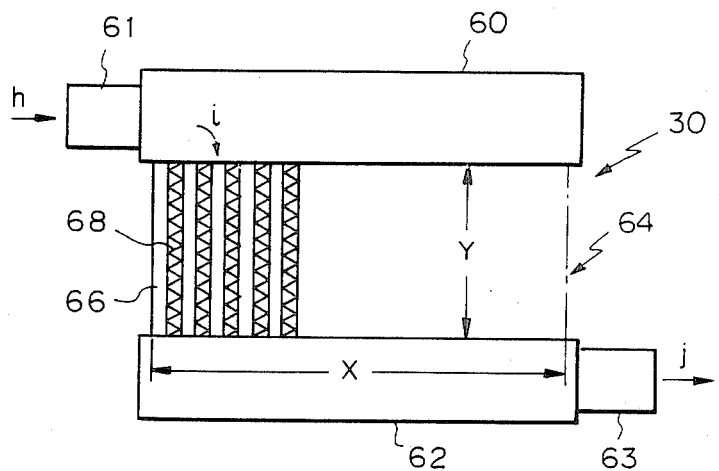
FIG. 3 is a front view of the intercooler according to the present invention taken along the line III in FIG. 1.
Figure 4:
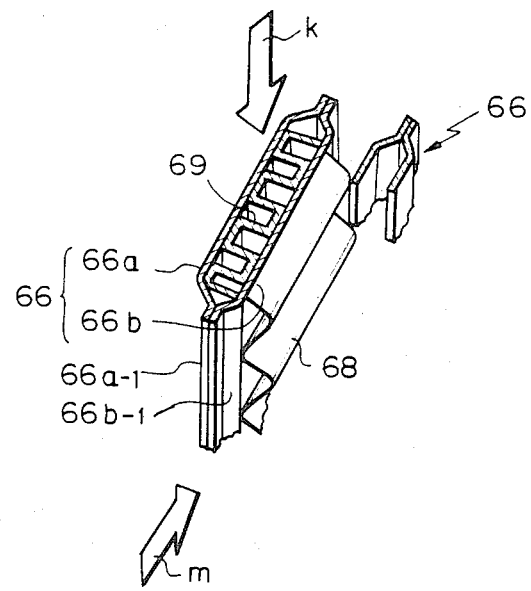
FIG. 4 is a fragmented perspective view of heat exchanging pipes in the intercooler according to the present invention.

In FIG. 3, the intercooler 30, shown from the front thereof, is provided with an upper tank 60, a lower tank 62, and a heat exchanger core 64. The upper tank 60 has an inlet 61, as shown also in FIG. 1, connected to the intake pipe 28 to receive the compressed air from the turbochargers 16A and 16B. As shown in FIG. 3, the lower tank 62 is provided with an outlet pipe 63, also shown in FIG. 1, connected to the intake pipe 32 to supply the cooled air into the engine cylinders (not shown). The core 64 has a plurality of heat exchanger pipes 66, arranged vertically and in parallel, connecting the upper and lower tanks 60 and 62, and corrugated fins 68 are arranged between the adjacent heat exchanger pipes 66 in such a manner that the fins 68 are in contact with the outer surfaces of the heat exchanger pipes 66. As shown in FIG. 4, each of the heat exchanger pipes 66 has a pair of plates 66a and 66b having a flattened U-shape cross section connected to each other at their flange portions 66a-1 and 66b-1 by welding, so that a vertically elongated passageway is formed between the plates 66a and 66b. A corrugated fin 69 is arranged in the passageway so that it is in contact with the inner surfaces of the plates 66a and 66b.

According to the present invention, as shown in FIG. 3, the heat exchanger pipes 66 extend vertically. In other words, the heat exchanger pipes 66 are juxtaposed along the horizontal direction. Furthermore, the elongation X of the core 64 in the horizontal direction, in which the heat exchanger pipes 66 are juxtaposed, is larger than the elongation Y of the core in the vertical direction, in which each heat exchanger core 66 extends.

The operation of the present invention will now be described. The exhaust gas from the exhaust manifolds 40A and 40B is introduced into the turbochargers 16A and 16B via the turbine inlet pipes 42A and 42B, respectively, and then exhausted to the exhaust pipe 46 via the outlet pipes 44A and 44B, respectively. Thus, the turbochargers 16A and 16B attain the required supercharging operation for sucking air from the airflow meter 22 via the intake pipe 20 and the compressor inlets 18A and 18B, and for forcibly introducing the sucked air from the compressor outlets 26A and 26B into the engine body 10 via the intake pipe 28, intercooler 30, intake pipe 32, surge tank 36, and intake manifold 38.

In the intercooler 30, the air from the turbochargers 16A and 16B is introduced into the upper tank 60 via the inlet pipe 61, as shown by an arrow h in FIG. 3. The air in the upper tank 60 is distributed to the heat exchanger pipes 66, as shown by an arrow i, from above. The air then flows downward in the heat exchanger pipes 66, as shown by an arrow k in FIG. 4, toward the lower tank 62. The air is then directed to the engine via the outlet 63, as shown by an arrow j in FIG. 3. The temperature of the air in the upper tank 60 is high due to the compression operation in the turbochargers 16A and 16B. When flowing in the heat exchanger pipes 66, as shown by the arrow k in FIG. 4, the hot air is cooled by the flow of cool air, as shown by an arrow m, generated by the flow of external air introduced into the engine room 50, as shown by the arrows e and f, via the radiator grille 52 and the space between the bumper 54 and the air dam skirt 56 when the vehicle is moving. Thus, the temperature of the air is cooled to an appropriate temperature at the lower tank 62.

According to the present invention, in FIG. 3, the core 64 of the intercooler 30 has a vertical elongation Y in the direction in which each heat exchanger pipe 68 extends smaller than the horizontal elongation X in the direction in which the heat exchanger pipes are arranged in juxtaposition to each other. This means that elongation of the heat exchanger pipe 66 having a small and restricted diameter becomes small, and thus any pressure drop occurring when the air is passed through the pipe 66 is decreased.

Figure 5:
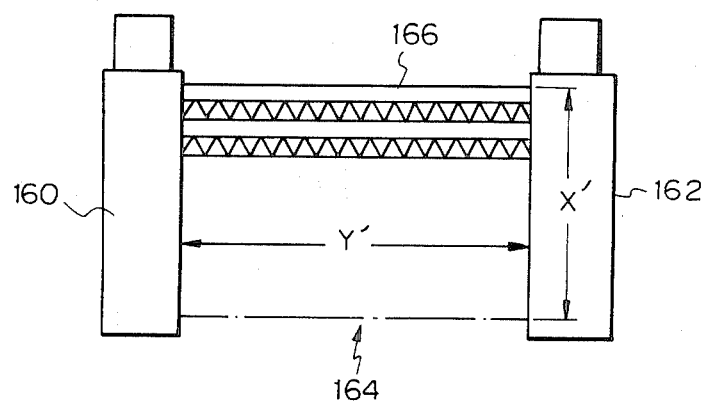
FIG. 5 is a front view of an intercooler according to a prior art.
Figure 6:
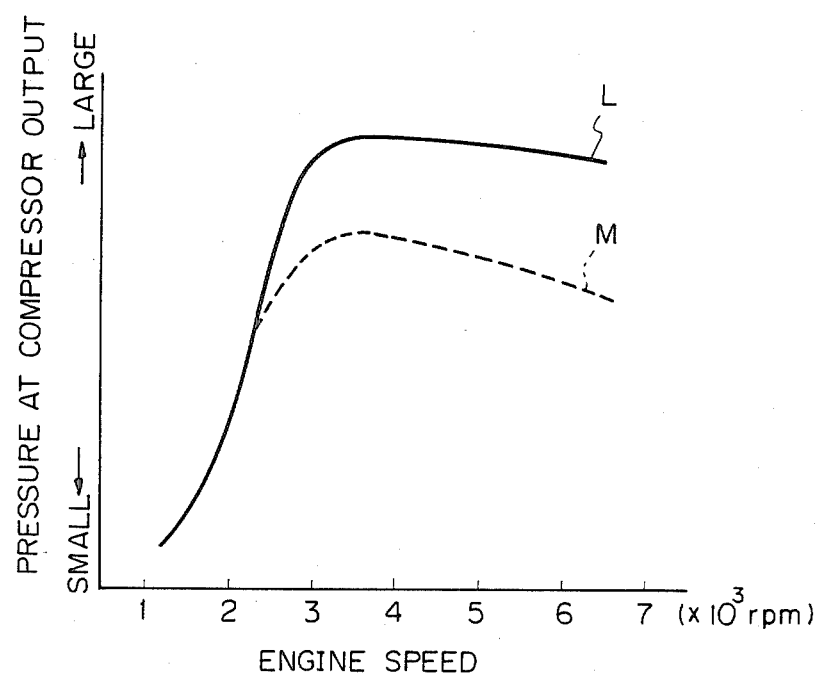
FIG. 6 shows the relationship between an engine speed and a compressor outlet pressure to obtain a constant intake pressure according to the present invention, in comparison with the prior art; and, FIG. 7 shows the relationship between the pressure drop across the intercooler and the lapse of time necessary to attain a predetermined level pressure in a surge tank of the engine after the commencement of acceleration.

According to the prior art construction, as shown in FIG. 5, the tanks 160 and 162 are horizontally spaced in place of the horizontal spacing of those tanks in the present invention. Therefore, the heat exchanger pipes 166 extend horizontally. In this case, the core 164 must be elongated further in the horizontal direction to allow the core to be arranged in the limited space available in the engine room in front of the radiator 14, as described with reference to the present invention (FIG. 1). Therefore, the elongation Y' in the direction in which each heat exchanging pipe 166 extends is larger than the elongation X' in the vertical direction in which the pipes 166 are juxtaposed. In this prior art construction, the length Y' of the heat exchanger pipes 166 having a restricted diameter is larger than the length Y of the heat exchanger pipe 66 of the present invention. Therefore, a large pressure drop occurs when the air is passed through the heat exchanger pipes 166 according to the prior art construction. FIG. 6 shows the relationships between the engine speed and pressure of the air at the compressor outlet when a constant pressure is maintained in the surge tank 36. Curve L shows the relationship in the prior art construction, and curve M shows the relationship in the present invention. According to the present invention, a pressure drop at the intercooler 30 is decreased, and therefore, pressure at the inlet side of the intercooler can be decreased to obtain the same pressure at the outlet side of the intercooler, in comparison with the prior art construction. This means that the pressure of air at the compressor outlets 26A and 26B of the turbochargers 16A and 16B can be decreased, to obtain the same engine power, and corresponds to the intake air pressure in the surge tank 36. Since the pressure of air at the compressor outlets 26A and 26B can be decreased, the rotational speed of the turbocharger can be decreased, although a constant engine power is maintained. Thus reliable operation of the turbochargers can be obtained for a prolonged period of time.

The low pressure drop in the intercooler according to the present invention can also increase the speed of response during acceleration. FIG. 7 shows the relationship between the pressure drop and the lapse of time in which the vacuum in the surge tank reaches a constant value (for example, 300 mmHg) after the commencement of acceleration. The intercooler of the prior art construction is designated by a point p1, while the present invention is designated by a point p2. As shown in FIG. 7, the speed of response can be increased by the present invention.

The vertical arrangement of the heat exchanger pipes 66 according to the present invention also allows the flow of air from the air dam skirt 56 to be evenly directed to the spaces between the heat exchanger pipes 66 of the core 64. Thus, the air in the intercooler 30 can be effectively cooled, permitting the engine output to be increased. Contrary to this, the horizontal arrangement of the heat exchanger pipes 166 in the prior art prevents the flow of air from the air dam skirt from being smoothly directed to the heat exchanger pipes on the upper side, because the flow of air is blocked by the pipes located on the bottom side. The present invention can obviate this difficulty.

When the intercooler is arranged in the space at the back of the radiator grille 52 or air dam skirt 56, there is no space for extending it in the vertical direction while there is a space for extending it in the horizontal direction. Therefore, the horizontally juxtaposed arrangement of the heat exchanging pipes 66 having a short length, according to the present invention, permits a required heat exchanging area to be maintained while preventing a large pressure drop from occurring.

In the described embodiment, the inlet pipe 61 to the upper tank and the outlet pipe 63 from the lower tank are mounted at opposite ends of the intercooler 30. However, the present invention is not limited to this construction. The inlet pipe 61 and outlet pipe 63 both can be mounted on the same side.

The present invention can be applied to a supercharger system provided with a mechanical supercharger operated by the crankshaft of the engine. Although a description of the present invention has been made with reference to one embodiment thereof, it is obvious that many modifications and changes can be made to the invention by those skilled in this art without departing from the scope of the invention.

What is claimed is:

1. A vehicle comprising an engine room having a radiator grille at a front end thereof, an engine room hood lock support at a position behind said radiator grille, a bumper located below said radiator grille, and an air dam skirt located below said bumper; a tranversely extending chamber-like space formed between said radiator grille, said hood lock support, said bumper and said air dam skirt; an engine body provided within said engine room; a supercharging system in fluid communication with said engine body, said supercharging system comprising a pair of turbochargers arranged in parallel; and an intercooler provided in said chamber-like space, said intercooler comprising an inlet tank in fluid communication with said supercharger system for receiving compressed air therefrom, an outlet tank in fluid communication with said engine body for introducing cool air into said engine body, and a radiator core arranged between said inlet tank and said outlet tank, said radiator core comprising a plurality of horizontally juxtaposed and vertically extending heat exchanger pipes between which air can pass in order to cool compressed air in said heat exchanger pipes, said radiator core having a length in the horizontal direction which is greater than a height of said radiator core in the vertical direction; wherein air passing over said air dam skirt, below said bumper, is directed onto said vertically extending heat exchanger pipes of said intercooler.

2. The vehicle according to claim 1, wherein each of said heat exchanger pipes is provided with fins therein.

* * * * *

UNITED STATES PATENT AND TRADEMARK OFFICE
CERTIFICATE OF CORRECTION

PATENT NO. : 4,702,079

DATED : October 27, 1987

INVENTOR(S) : Taiji SAITO ET AL.

It is certified that error appears in the above-identified patent and that said Letters Patent is hereby corrected as shown below: On the title page Item [73] Assignee should read as follows:

--[73] Assignee: Toyota Jidosha Kabushiki Kaisha, Japan --

Signed and Sealed this

Nineteenth Day of July, 1988

Attest:

DONALD J. QUIGG

*Attesting Officer*

*Commissioner of Patents and Trademarks*